Dec. 26, 1967 H. KORETZKY 3,360,397

PROCESS OF CHEMICALLY DEPOSITING A MAGNETIC COBALT FILM FROM A BATH CONTAINING MALONATE AND CITRATE IONS

Filed April 29, 1964

INVENTOR

HERMAN KORETZKY

BY George O. Saile

ATTORNEY

United States Patent Office 3,360,397

Patented Dec. 26, 1967

3,360,397

PROCESS OF CHEMICALLY DEPOSITING A MAGNETIC COBALT FILM FROM A BATH CONTAINING MALONATE AND CITRATE IONS

Herman Koretzky, Poughkeepsie, N.Y., assignor to International Business Machines Corporation, New York, N.Y., a corporation of New York Filed Apr. 29, 1964, Ser. No. 363,480
4 Claims. (Cl. 117—160)

ABSTRACT OF THE DISCLOSURE

Magnetic cobalt films having controlled coercivity are provided by selecting the concentrations of citrate ions and malonate ions in electroless cobalt plating baths of the cobalt cation-hypophosphite anion type. By controlling the concentrations of the citrate ions and malonate ions magnetic cobalt films having controlled coercivities within the range of 400 to 700 oersteds are obtained.

Figure 2:
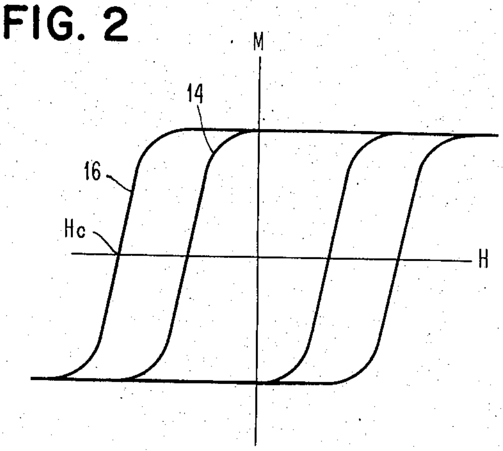

Magnetic recording devices in the form of a thin film of magnetic material on a substrate such as a tape, drum, disc, loop surface and the like are extensively used in computer and data processing systems. The most extensively used magnetic coating is a finely divided ferric oxide dispersion in a thermoplastic binder composition. Electrodeposited ferromagnetic films such as cobalt-nickel alloy films have also found use where a high-density data storage is required. There have been suggestions that an electroless plated cobalt or a cobalt-nickel alloy film could be used as the magnetic layer for magnetic recording devices. Although this cobalt electroless or cobalt-nickel alloy type of magnetic surface would apparently have great advantages in ease of producing the magnetic coating, this type of magnetic coating has not found commercial success.

The electroless deposition of ferromagnetic metallic layers is known to the art. This type of metallic deposition does not depend on the presence of a couple between galvanically dissimilar metals. Instead, the mechanism of the reaction is based on a chemical added to the plating solution which acts as a reducing agent for the metal being plated. In electroless plating, the metal ion in solution is reduced to the corresponding metal by gaining the required number of electrons. The source of these electrons is the oxidation of a reducing agent in the plating solution which generally in the art is the hypophosphite ion. The plating process has the obvious advantage over electroplating in that the substrate on which the metal is deposited need not be a conductive one. A thin, ferromagnetic film, such as cobalt, can then be applied, for example, to a thermoplastic base material. Where the thermoplastic base is an elongated tape, the coating upon the base results in an elongated magnetic tape which has an extremely low inertia and is flexible enough to travel at high speeds around bearing members such as capstans or the like.

A ferromagnetic metal coating is superior to the widely used magnetic ferric oxide type of magnetic coating. The magnetic oxide is dispersed in a thermoplastic binder composition which makes up at least 50% of the volume of the coating. It is therefore necessary that a considerable thickness of coating be built up on the substrate in order to obtain a desired level of output. Recording mediums of this magnetic oxide type also are found to have a rough or abrasive surface and do not provide the optimum conformity to the magnetic recording head. The bit density storage capacity of magnetic oxide mediums is also quite low in comparison to the ferromagnetic metal coated recording mediums.

It is further known in the prior art to use an alkaline electroless plating solution for plating films of cobalt. In such solutions, complexing or chelating agents are commonly used to prevent the precipitation of metal hydroxide from the solution, and to control the rate of plating and the appearance of the deposit. The complexing agents used in the past for electrolessly depositing cobalt were tartaric or citric acids. These prior art cobalt plating solutions were used to deposit cobalt where the magnetic properties of the cobalt thin film were either not important or those in the art had no better complexing agent to use. It has been found that the tartrate ion in the cobalt electroless plating bath produces deposits exhibiting coercivity higher than desired for optimum recording characteristics in magnetic record members. The use of citrate, on the other hand, as the complexing agent in a cobalt electroless plating solution produces thin films having magnetic properties, such as coercivity, which are not conveniently controllable. The coercivities may vary from 600 to 1200 oersteds. The operating concentration of the citrate ion in solution must then be controlled within very narrow limits to produce a magnetic film of one coercivity along its entire length. Further, the precise coercivity desired cannot be obtained in this type of plating bath.

The production of magnetic recording films of a particular desired coercivity is critically important for data processing uses. This is so because the utilization of these magnetic films of cobalt or a cobalt-nickel alloy as a magnetic recording surface requires that they be fabricated so as to possess a predetermined coercivity and thereby function predictably as memory films in such magnetic devices as tapes, loops, drums, discs and the like. The desired coercivity for a particular application may vary substantially from that of other applications. Such a coercivity may be as low as 0.5 oersted in one case and as high as 1200 oersteds in another. It is therefore seen that there is a great need for a technique for depositing a magnetic film having a controlled coercivity. Such a technique would allow the production of an optimum coercivity magnetic film for the particular application intended.

It is thus an object of this invention to provide a chemical reduction process for depositing a magnetic cobalt thin film having a controlled coercivity.

It is a further object of this invention to provide an aqueous electroless cobalt bath which uses a complexing agent system that allows the choice of the coercivity magnitude of the resulting cobalt deposit by changing the ratios of the components of the complexing agent system.

It is a still further object of this invention to provide a chemical reduction process for depositing a magnetic cobalt thin film having optimum coercivities and without a rapid deterioration of the plating bath by use of a citrate-malonate complexing agent system.

It is another object of this invention to provide a magnetic record member having an electroless cobalt deposited thin film magnetic surface of optimum magnetic properties which has been deposited from a cobalt electroless bath which contains a citrate-malonate complexing agent system.

These and other objects are accomplished in accordance with the broad aspects of the present invention by providing a chemical reduction process which utilizes an electroless cobalt bath containing a novel complexing agent system. It has been discovered that by using a source of citrate ion and a source of malonate ion in an electroless cobalt plating bath and by varying the ratios between the citrate and the malonate ions a wide range of coercivities may be obtained in the deposited cobalt film. The other components of the aqueous electroless bath are a cobalt salt, an alkaline hypophosphite, an ammonium salt and ammonium hydroxide in sufficient quantities to maintain the solution pH between 8 and 11.

The optimum coercivity value for metal coated magnetic recording tape is 575±175 oersteds. The coercivity of the magnetic tape should be within this range and should be within a narrow range of values over the entire length of the magnetic medium. A region of almost constant coercivity within this desired coercivity range has been observed for electroless cobalt using the citrate-malonate complexing agent system. In the range of 600 to 700 oersteds, the ratio of malonate to citrate may be varied considerably without the electroless deposition of cobalt having a coercivity out of the 600 to 700 oersted range. The importance of this discovery is particularly significant where an elongated magnetic tape is being continuously electrolessly plated with a cobalt thin film. Under such conditions small portions of the complexing agent are dragged out along with the continuously moving tape. A portion of the complexing agent system is then lost to the electroless plating bath. The cobalt electroless coating can be maintained at a coercivity within the 600 to 700 oersted range despite this drag-out of complexing agent system because of the relatively constant coercivity value over a range of malonate and citrate compositions.

The foregoing and other objects, features and advantages of the present invention will be apparent from the following more particular description of the preferred embodiments of the invention as illustrated in the accompanying drawings.

Figure 1:
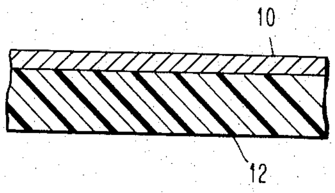
Figure 3:
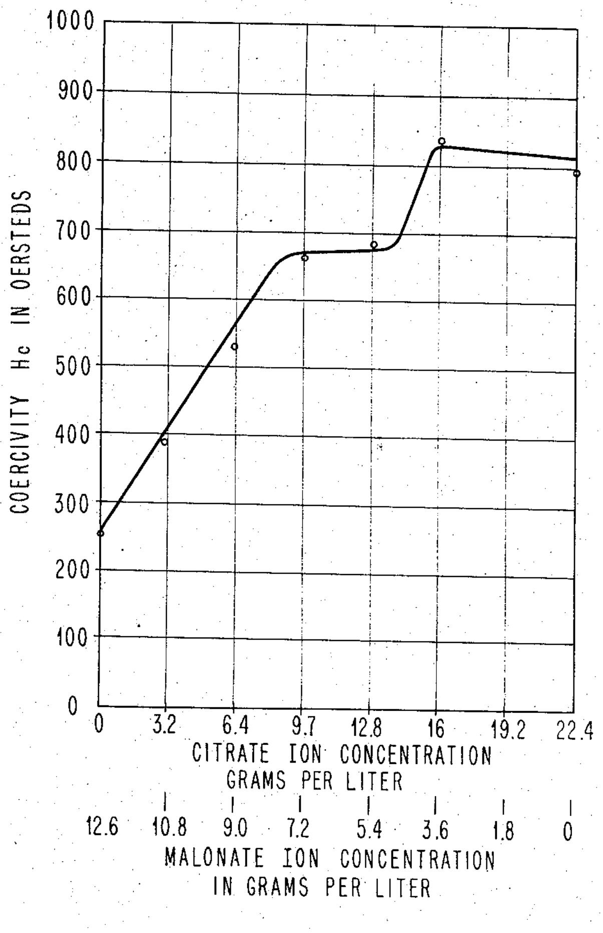

In the drawings:

FIGURE 1 is a cross-sectional illustration of the magnetic record member of the present invention;

FIGURE 2 shows generalized hysteresis loops comparing the cobalt electroless deposit using malonate complexing agent as compared to the cobalt electroless deposit using the citrate complexing agent; and FIGURE 3 is a graphical illustration showing the wide variation of coercivity in an electroless cobalt deposit over the range of malonate to citrate ratios which are pertinent to the present invention.

The great advantage of the electroless cobalt plating is that it may be applied to any substrate, including nonconductors such as glass, ceramics, plastics, etc. The FIGURE 1 shows the thin cobalt magnetic coating 10 of from 250 to 5000 angstrom units in thickness supported on a plastic substrate 12. This is the ideal structure for high density magnetic recording tape where the magnetic cobalt layer has a coercivity of constant value within the range of 575±175 oersteds and has a hysteresis loop which is substantially square, that is the ratio of remanent magnetization to saturation magnetization $M_r/M_s$ is approximately equal to one. For other magnetic memory devices such as a magnetic drum or disc, a metallic substrate may be substituted for the plastic substrate.

Prior to the electroless deposition of cobalt onto the substrate, the substrate must first be prepared by cleaning, making its surface hydrophilic, and sensitizing its surface. The cleaning step involves conventional mechanical scrubbing and chemical cleaning techniques. Non-metallics, such as plastics, ceramics and glass, are generally hydrophobic, that is, surfaces which show a water-break, so that it is necessary with these materials to make their surface to be electrolessly plated hydrophilic, that is, showing no water-break. A surface to be rendered hydrophilic can be first mechanically roughened as with an abrasive material or the like. A chemical etching process is then preferably used to further condition the surface to make mechanical keying points over the surface which subsequently allows good bonding between the electroless plating and the nonconductor. In the case of a polyethylene terephthalate web, for example, a conditioning treatment is necessary. The preferred treatment is described in U.S. patent application Serial No. 138,609, filed September 18, 1961, now U.S. Patent 3,142,581, or Serial No. 153,187, filed November 17, 1961, now U.S. Patent 3,142,582, both of which are assigned to the assignee of the present invention.

The surface must be sensitized following the cleaning and conditioning steps, whether the surface to be electrolessly deposited on is a noncatalytic metallic one or a nonconductor surface. The preferred sensitizing technique is successive dips in stannous chloride solution, water rinse, palladium chloride solution, and a final water rinse. In the sensitizing process the stannous ion is absorbed onto the surface of the substrate during the stannous chloride dip. The absorbed stannous ion is readily oxidized. Therefore, when the substrate having the stannous ion absorbed thereon is dipped into the solution containing the noble metal palladium, the metal is reduced and is absorbed onto the surface of the substrate. The palladium on the substrate acts as a catalytic surface for the subsequent electroless plating.

The preferred and operative ranges of composition of the aqueous electroless cobalt plating bath are given in grams per liter in the following Table I.

TABLE I

| | Operativo | Preferred |
|---|---|---|
| Cobaltous ion ($Co^{++}$) | 5.7 to 8.7 | 6.5 to 8.0. |
| Hypophosphite ion ($H_2PO_2^-$) | 3 to 24.5 | 6.1 to 18.3. |
| Citrate ion ($C_6H_5O_7^{=}$) | 0.5 to 21.8 | 0.5 to 21.8. |
| Malonate ion ($C_3H_2O_4^{-}$) | 0.4 to 12.2 | 0.4 to 12.2. |
| Ammonium ion ($NH_4^+$) | 1 to 100 | 8 to 27. |

The cobalt ion is provided by use of any suitable soluble cobalt salt such as cobalt chloride, cobalt sulfate, cobalt acetate and cobalt sulfamate. The hypophosphite ion is brought into solution by use of an alkaline hypophosphite. The ammonium ion is brought into solution from a soluble buffering salt, such as ammonium sulfate, and ammonium hydroxide. The citrate ion is obtained from a material selected from the group consisting of citric acid and an alkaline citrate. Malonic acid or an alkaline malonate is used to provide the malonate ion in solution.

The pH of the solution is maintained within the alkaline range of about 8 to 11. This alkalinity is secured by use of additives such as ammonium hydroxide and ammonium salts such as ammonium chloride or sulfate. The preferred alkaline range is a pH value of 9 to 10 which may be maintained by constant addition to the bath of ammonium hydroxide.

Referring now to FIGURE 2, there are shown hysteresis loops for cobalt electroless plating baths containing malonate ion as the complexing agent, as hysteresis loop 14, and citrate ion as the complexing agent, as hyteresis loop 16. The coercivity of a magnetic material such as the cobalt thin film is defined as the ability to retain magnetism in spite of an adverse treatment such as the application of a field or force in a direction directly opposite to that value. The value of the coercivity Hc, for a given magnetic material, is the intersection of the hysteresis loop of the material with the negative magnetization field intensity axis H. In the complexing agent system of the present invention, where no citrate ion is present and the malonate ion to cobalt ion ratio is approximately 1 to 1, the coercivity is of a minimum value approximately 200 oersteds. Where only citrate ion is in the solution and the citrate to cobalt ion ratio is approximately 1 to 1, the coercivity is maximum but not readily controllable and in the range of 600 to 1200 oersteds. The coercivity of the electrolessly deposited cobalt film is controlled in the present invention by varying the concentration of the citrate-malonate complexing agent system in the aqueous plating bath.

The FIGURE 3 shows how, by varying the concentrations of the malonate and citrate ions in the aqueous electroless cobalt solution, a desired coercivity in the deposited cobalt film may be obtained within a range of approximately 250 to 850. The deposition rate over the entire range has been found to be quite adequate. Cobalt films having approximately 200 oersteds coercivity are deposited in thickness at a rate of about 12 microhenries per minute. Cobalt films with coercivities of approximately 800 oersteds are deposited in thickness at a rate of about 8 microhenries per minute. Intermediate deposition rates between these extremes have been found for cobalt baths which produce intermediate coercivity cobalt films.

The discovery of this relationship is very important since now by merely varying the concentrations of the malonate and citrate ions in the electroless bath it is possible to obtain a selected coercivity of electroless cobalt coating for the desired purpose of the cobalt film. For example, cobalt films can be obtained having coercivities 250 and 400 oersteds by varying the concentrations of malonate and citrate ions in the solution between about 0.5 gram per liter citrate ion and 12.2 grams per liter malonate ion to about 3.9 grams per liter citrate ion and 10.4 grams per liter malonate ion. A coercivity range between 400 and 700 oersteds is obtained by varying the concentrations of the malonate and citrate ions in the solution between about 3.9 grams per liter citrate ion and 10.4 grams per liter malonate ion to about 13.4 grams per liter citrate ion and 5.1 grams per liter malonate ion.

The coercivity "plateau" in the area of 600 to 700 oersteds is also a significant discovery. Although the complexing agent system is not used up in the electroless deposition reduction process, some of the complexing agents can be dragged out of the bath in a continuous electroless deposition in, for example, a continuous coating of an elongated film process for making magnetic tape. The plateau of coercivity of 600 to 700 oersteds is extremely convenient since this is within the ideal range of coercivities for magnetic tape recording surfaces. Higher coercivities above 800 keep the tape from being saturated during the writing of a bit of information with the write-head; while, in turn, lower coercivities of magnetic coatings are too easily demagnetized and information can thereby be lost.

The beneficial action of the citrate-malonate complexing agent system in the electroless cobalt solution is believed to be due to the presence of the simple cobalt-ammonium $Co(NH_3)_6^{++}$; cobalt-citrate, $Co(C_6H_5O_7)$; and cobalt-malonate, $Co(C_3H_2O_4)$ ionic complexes. Mixed complexes of cobalt, ammonium, citrate and malonate ions may also exist in the solution, although their exact roles in the reduction of the cobalt ions and their exact compositions, stabilities and stoichiometries are not known. Experiments have shown that the cobalt-ammonium complex is the most stable of these complexes because little or no deposition takes place where the cobalt-ammonium complex is the only complex present in the cobalt electroless solution. The cobalt-citrate complex is of intermediate stability. The cobalt-malonate complex is the least stable of the three complexes. The relative stabilities of these complexes have been determined from electroless plating rate studies. At the elevated electroless cobalt solution operating temperatures, the three simple complexes exist in varying concentrations according to the concentrations of the specific complexing agents and the stability constants of these complexing agents with cobalt ion. Deposition will preferentially take place from the malonate complex and thus the malonate ion in this electrolyte will act as a bridge between the cobalt in solution and cobalt being deposited onto the catalytic substrate. Of course, some deposition will also take place from the citrate complex and perhaps some very limited amount from the ammonium complex.

The following examples are included merely to aid in the understanding of the invention, and variations may be made by one skilled in the art without departing from the spirit of the invention.

*Example 1*

A polyethylene terephthalate web was first conditioned according to the treatment of U. S. Patent 3,142,582, referred to above, and then sensitized by successive exposure to a stannous chloride solution and a palladium solution with water rinsing after each exposure. The stannous chloride solution included 30 grams per liter of stannous chloride, 10 milliliters per liter of hydrochloric acid, and the balance water. The palladium chloride solution included 0.1 gram per liter palladium chloride, 10 milliliters per liter hydrochloric acid and the balance water. The sensitized web at this time had palladium on its surface.

The presensitized web was placed in an electroless cobalt plating solution. The electroless bath had the following composition and operating conditions:

| | |
|---|---|
| Cobalt sulfate ($CoSO_4.7H_2O$) ----------g./l-- | 34.5 |
| Sodium hypophosphite ($NaH_2PO_2.H_2O$)--g./l-- | 20 |
| Ammonium sulfate $(NH_4)_2SO_4$ ---------g./l-- | 66 |
| Sodium citrate ($Na_3C_6H_5O_7.2H_2O$) ------g./l-- | 35 |
| [Citrate ion ($C_6H_5O_7\equiv$) ----------g./l-- | 22.4] |
| pH (adjusted with ammonium hydroxide $NH_4OH$) ------------------------------ | 9.0 |
| Temperature -------------------------° F-- | 165±5 |

The web was allowed to remain in the plating bath 60 seconds. No agitation was used during the deposition. A bright and continuous appearing metallic cobalt deposit was observed on the web. The precise composition of the metallic deposit and a full range of magnetic properties were obtained on the deposit by standard techniques and are listed in the Table III.

*Examples 2, 3, 4, 5, 6 and 7*

The conditioning and sensitizing procedure of Example 1 was used to condition and sensitize a polyethylene terephthalate web for each example. The web was placed in the electroless cobalt plating bath. The electroless bath had the following basic composition and operating conditions:

| | |
|---|---|
| Cobalt sulfate ($CoSO_4.7H_2O$) ----------g./l-- | 34.5 |
| Sodium hypophosphite ($NaH_2PO_2.H_2O$)--g./l-- | 20 |
| Ammonium sulfate $(NH_4)_2SO_4$ ---------g./l-- | 66 |
| pH (adjusted with ammonium hydroxide $NH_4OH$) ------------------------------ | 9.0 |
| Temperature -------------------------° F-- | 165±5 |

The complexing agent system of citrate ion and malonate ion used for each respective example is given as Table II.

TABLE II

| Examples | Sodium citrate ($Na_3C_6H_5O_7{\cdot}2H_2O$) (g./l.) | [Citrate ion ($C_6H_5O_7^{\equiv}$)] (g./l.) | Malonic acid $CH_2(COOH)_2$ (g./l.) | [Approximate malonate ion ($C_3H_2O_4^{=}$)] (g./l.) |
|---|---|---|---|---|
| 2---------- | 30 | 19.2 | 1.8 | 1.8 |
| 3---------- | 25 | 16.0 | 3.6 | 3.6 |
| 4---------- | 20 | 12.8 | 5.4 | 5.4 |
| 5---------- | 15 | 9.7 | 7.2 | 7.2 |
| 6---------- | 10 | 6.4 | 9.0 | 9.0 |
| 7---------- | 5 | 3.2 | 10.8 | 10.8 |

Each web was allowed to remain in its respective plating bath 60 seconds. No agitation was used during the deposition in any of the examples. A bright and continuous appearing metallic cobalt deposit was observed on each of the webs. The precise composition of the metallic deposit and a full range of magnetic properties obtained on the deposits of each example's web by standard techniques are listed in the Table III.

*Example 8*

The conditioning and sensitizing procedure of Example 1 was used to condition and sensitize a series of five polyethylene terephthalate webs. The webs were placed in different electroless cobalt plating baths. The electroless baths had the following composition and operating conditions:

| | | |
|---|---|---|
| Cobalt sulfate ($CoSO_4.7H_2O$) | g./l. | 34.5 |
| Sodium hypophosphite ($NaH_2PO_2.H_2O$) | g./l. | 20 |
| Ammonium sulfate $(NH_4)_2SO_4$ | g./l. | 66 |
| Malonic acid $(CH_2(COOH)_2$ | g./l. | 12.6 |
| [Malonate ion ($C_3H_2O_4^{=}$) | g./l. | 12.6] |
| pH (adjusted with ammonium hydroxide $NH_4OH$) | | 9.0 |
| Temperature | ° F. | 165±5 |

The sensitized webs were dipped into their respective baths. Each web was held in its bath for a different time. The times were 45 seconds, 60 seconds, 90 seconds, 180 seconds and 210 seconds. There was no agitation in any of these platings. All coatings came out bright and continuous. The coatings were tested for composition and for the full range of magnetic properties by standard techniques with the results listed in the Table III.

What is claimed is:

1. A chemical reduction process for depositing onto a catalytic substrate magnetic cobalt film having coercivity in the range of about 400 to 700 oersteds comprising:
   subjecting said substrate to an aqueous solution of a cobalt salt, an alkaline hypophosphite, a material which produces malonate ion in solution selected from the group consisting of malonic acid and an alkaline malonate, and a material which produces citrate ion in solution selected from the group consisting of citric acid and an alkaline citrate;
   wherein the total available concentration of cobalt ions is between about 5.7 and 8.7 grams per liter, the total available concentration of hypophosphite ions is between about 3 and 24.5 grams per liter, the total available concentration of malonate ions is between 5.1 and 10.4 grams per liter and the total available concentration of citrate ions is between 3.9 and 13.4 grams per liter; and
   wherein the pH of the solution is maintained between about 8 and 11.
2. The process of claim 1 by which the magnetic cobalt film produced has a coercivity in the range of about 400 and 600 oersteds wherein the total available concentration of malonate ions in solution is between 8.2 and 10.4 grams per liter and the total available concentration of citrate ions in solution is between 3.9 and 7.8 grams per liter.
3. The process of claim 1 by which the magnetic cobalt film produced has a coercivity in the range of about 600 and 700 oersteds wherein the total available concentration of malonate ions in solution is between 5.1 and 8.2 grams per liter, and the total available concentration of citrate ions in solution is between 7.8 and 13.4 grams per liter.
4. The process of claim 3 wherein the total available concentration of cobalt ions in solution is between 6.5 and 8.0 grams per liter and the total available concentration of hypophosphite ions in solution is between 6.1 and 13.3 grams per liter.

TABLE III

| Examples | Cobalt Deposit in mg./cm.$^2$ | Phosphorus Deposit in mg./cm.$_2$ | Total Deposit in mg./cm.$^2$ | Percent Phosphorus | Thickness in ° A. | Coercivity Hc in oersteds | Remanent Magnetization, $M_r$ in emu $\times 10^3$ | Saturation Magnetization, $M_s$ in emu $\times 10^3$ | Squareness Ratio, $M_r/M_s$ |
|---|---|---|---|---|---|---|---|---|---|
| 1 | --- | --- | --- | 2.5 | --- | 806 | 8.8 | --- | --- |
| 2 | 0.109 | 0.009 | 0.118 | 7.63 | 1,405 | 838 | 11.7 | 18.8 | 0.62 |
| 3 | 0.070 | 0.002 | 0.072 | 2.78 | 826 | 837 | 9.27 | 17.1 | 0.66 |
| 4 | 0.174 | 0.011 | 0.185 | 5.95 | 2,174 | 677 | 20.4 | 28.4 | 0.72 |
| 5 | 0.124 | --- | 0.124 | 0.40 | 1,373 | 670 | 15.0 | 21.1 | 0.71 |
| 6 | 0.188 | 0.003 | 0.191 | 1.57 | 2,170 | 526 | --- | --- | --- |
| 7 | 0.216 | 0.0009 | 0.2169 | 0.41 | 2,445 | 380 | --- | --- | --- |
| 8 (t=45) | 0.238 | 0.007 | 0.245 | 2.86 | 2,813 | 247 | 6.25 | 14.6 | 0.43 |
| (t=60) | 0.388 | 0.009 | 0.397 | 2.27 | 4,537 | 256 | 15.9 | 23.4 | 0.68 |
| (t=90) | 0.513 | 0.020 | 0.533 | 3.75 | 6,162 | 204 | 15.2 | 31.4 | 0.48 |
| (t=180) | 1.063 | 0.024 | 1.087 | 2.20 | 12,409 | 210 | 22.2 | 45.5 | 0.49 |
| (t=210) | 1.275 | 0.032 | 1.307 | 2.45 | 14,954 | 214 | 21.4 | 52.7 | 0.41 |

The magnetic coercivity values of the examples were plotted against the concentration of the complexing agent system as the FIGURE 3. It is therefore seen that by merely picking the concentration of the malonate-citrate complexing agent system as indicated by the FIGURE 3, a cobalt film may be electrolessly deposited with a desired coercivity. The plating rate is adequate with the resulting thicknesses of electroless cobalt deposit of adequate thickness for magnetic recording purposes. The squareness ratio obtained for Examples 2, 3, 4 and 5 are considered satisfactory. The Example 8 indicates the relationship of the coercivity with time of exposure in the plating bath. It is seen that with increased thickness of electroless plated deposit the coercivity of the film is reduced in value. This effect of reduction of coercivity with thickness has been found approximately proportional regardless of the composition of the complexing agent system.

While the invention has been particularly shown and described with reference to the preferred embodiments thereof, it will be understood by those skilled in the art that the foregoing and other advantages in form and detail may be made therein without departing from the spirit and scope of the invention.

References Cited

UNITED STATES PATENTS

| | | | |
|---|---|---|---|
| 2,532,284 | 12/1950 | Brenner et al. | 117—50 |
| 2,819,187 | 1/1958 | Gutzeit et al. | 117—130 |
| 2,871,142 | 1/1959 | Hays | 117—102 |
| 2,935,425 | 5/1960 | Gutzeit et al. | 117—130 |
| 3,011,920 | 12/1961 | Shipley | 117—213 |
| 3,238,061 | 3/1966 | Koretzky et al. | 117—138.8 |

OTHER REFERENCES

Gutzeit, G., "An Outline of the Chemistry Involved in the Process of Catalytic Nickel Deposition," part 4, Plating, pp. 63–70, January 1960.

MURRAY KATZ, *Primary Examiner.*

WILLIAM D. MARTIN, *Examiner.*

W. D. HERRICK, *Assistant Examiner.*

UNITED STATES PATENT OFFICE

CERTIFICATE OF CORRECTION

Patent No. 3,360,397 December 26, 1967

Herman Koretzky

It is hereby certified that error appears in the above numbered patent requiring correction and that the said Letters Patent should read as corrected below.

Column 5, lines 3 and 6, for "microhenries", each occurrence, read -- microinches --; line 29, for "agents read -- agent --; columns 7 and 8, TABLE III, ninth column, line 2 thereof, for "17.1" read -- 14.1 --.

Signed and sealed this 21st day of January 1969.

(SEAL)

Attest:

Edward M. Fletcher, Jr.

Attesting Officer

EDWARD J. BRENNER

Commissioner of Patents